(12) United States Patent
Huapaya et al.

(10) Patent No.: US 10,268,827 B2
(45) Date of Patent: Apr. 23, 2019

(54) METHOD AND SYSTEM FOR SECURING DATA

(71) Applicant: EMC CORPORATION, Hopkinton, MA (US)

(72) Inventors: Luis Miguel Huapaya, Gloucester (CA); Lejin Du, Kanata (CA); Murray McCulligh, Ottawa (CA)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/696,708

(22) Filed: Apr. 27, 2015

(65) Prior Publication Data

US 2015/0227748 A1 Aug. 13, 2015

Related U.S. Application Data

(63) Continuation of application No. 13/304,010, filed on Nov. 23, 2011, now abandoned.

(60) Provisional application No. 61/416,569, filed on Nov. 23, 2010.

(51) Int. Cl.
*G06F 12/14* (2006.01)
*G06F 11/30* (2006.01)
*G06F 21/60* (2013.01)
*H04L 9/08* (2006.01)

(52) U.S. Cl.
CPC .......... *G06F 21/602* (2013.01); *G06F 21/604* (2013.01); *H04L 9/088* (2013.01); *H04L 9/0894* (2013.01)

(58) Field of Classification Search
CPC ...... G06F 21/604; H04L 9/088; H04L 9/0894
USPC .......................................................... 713/189
See application file for complete search history.

(56) References Cited

U.S. PATENT DOCUMENTS

| | | | | |
|---|---|---|---|---|
| 6,487,665 B1 * | 11/2002 | Andrews | ................ | G06F 9/468 709/229 |
| 8,166,314 B1 * | 4/2012 | Raizen | .................... | G06F 21/78 711/164 |
| 8,505,084 B2 * | 8/2013 | Shukla | ................ | G06F 21/6218 709/219 |
| 2003/0014466 A1 * | 1/2003 | Berger | .................... | G06F 9/468 718/102 |
| 2003/0200459 A1 * | 10/2003 | Seeman | .................. | G06F 21/10 726/26 |
| 2005/0076228 A1 * | 4/2005 | Davis | ...................... | G06F 21/72 713/188 |
| 2005/0138110 A1 * | 6/2005 | Redlich | ............ | C07K 14/70575 709/201 |
| 2006/0075464 A1 * | 4/2006 | Golan | .................. | G06F 21/604 726/1 |

(Continued)

OTHER PUBLICATIONS

John Bethencourt; Ciphertext-Policy Attribute-Based Encryption; Carnegie Mellon University; IEEE 2007; p. 1-14.*

*Primary Examiner* — Monjur Rahim
(74) *Attorney, Agent, or Firm* — Aventum IP Law LLP (57) ABSTRACT

Disclosed is a method of supporting security policies and security levels associated with processes and applications. A security level is associated with a process independent of a user executing the process. When secure data is to be accessed, the security level of the process is evaluated to determine whether data access is to be granted. Optionally, the security level of a user of the process is also evaluated prior to providing data access.

15 Claims, 10 Drawing Sheets

(56) References Cited

U.S. PATENT DOCUMENTS

| | | | | |
|---|---|---|---|---|
| 2006/0117178 | A1* | 6/2006 | Miyamoto | G06F 21/556 |
| | | | | 713/165 |
| 2006/0259487 | A1* | 11/2006 | Havens | G06F 21/51 |
| 2008/0005586 | A1* | 1/2008 | Munguia | G06F 12/1408 |
| | | | | 713/189 |
| 2008/0107275 | A1* | 5/2008 | Asnaashari | G06F 21/79 |
| | | | | 380/281 |
| 2008/0127292 | A1* | 5/2008 | Cooper | G06F 21/53 |
| | | | | 726/1 |
| 2008/0196082 | A1* | 8/2008 | Sandoval | H04L 63/102 |
| | | | | 726/1 |
| 2009/0100524 | A1* | 4/2009 | Honda | G06F 9/468 |
| | | | | 726/26 |
| 2010/0057774 | A1* | 3/2010 | Pizano | G06F 21/53 |
| | | | | 707/E17.055 |
| 2010/0132053 | A1* | 5/2010 | Chishima | G06F 21/74 |
| | | | | 726/30 |
| 2010/0257578 | A1* | 10/2010 | Shukla | G06F 21/6218 |
| | | | | 726/1 |
| 2011/0296487 | A1* | 12/2011 | Walsh | G06F 21/10 |
| | | | | 726/1 |
| 2011/0296515 | A1* | 12/2011 | Krstic | G06F 21/53 |
| | | | | 726/10 |

\* cited by examiner

METHOD AND SYSTEM FOR SECURING DATA

CROSS REFERENCES TO RELATED APPLICATIONS

This application is a continuation of U.S. patent application Ser. No. 13/304,010, filed on Nov. 23, 2011, which claims the benefit of U.S. Provisional Patent Application No. 61/416,569, filed on Nov. 23, 2010, the entire contents of which are incorporated herein by reference.

FIELD OF THE INVENTION

The present invention relates generally to computer security and more particularly to data leakage protection.

BACKGROUND

The loss and theft of data has become such an impactful reality in today's computing world that many nations have or are enacting laws requiring sensitive information to be secured. For example, organizations handling sensitive information, such as medical or financial records are required to implement encryption processes to prevent the accidental disclosure or intentional misappropriation of sensitive information.

To that end, several "Enterprise Data Encryption" solutions, also known as "Data At Rest" or "Data In Motion," solutions have been implemented. Some of these known solutions and their known shortcomings are as follows:

Full Disk Encryption. These solutions implement a mechanism that encrypts an entire file system as it is stored on a storage medium. Only a system provided with a proper startup password successfully starts up and the storage devices, which are fully encrypted. Once the machine is started, anyone has access to the encrypted data—either now in plain text form or now accessible via a known decryption process or key. Moreover, full disk encryption solutions are very demanding of a computer's CPU and of a portable computer's batteries since all file access operations continually encrypt/decrypt data.

Volume Based Encryption. These solutions represent an improvement over the full disk encryption solutions insofar as only a portion of a file system, in this case a single volume, is encrypted. These solutions continue to suffer from the fact that once access is granted, all of the information within the volume becomes available without restriction. That said, locking of the computer can access to the secure data via the computer until it is unlocked. It has been recently shown that this type of security often poses a problem when the computer is accessible via an external port, wherein the security data once populated is accessible by the computer and secure data is therefore retrievable via the external port even when the computer is locked.

Folder Based Encryption. This solution only encrypts selected folders within a storage medium. It often suffers from the same drawbacks as were previously mentioned but is usually more CPU and battery efficient.

Each of the solutions listed above were designed to protect sensitive information from being stolen when a computing device went missing or was stolen. None of these solutions protect against a malicious employee who has access to the information. They are in a position to misappropriate the information by copying it to a portable storage device, by sending it over the Internet using email or FTP, etc.

It would be advantageous to provide a solution that not only protects sensitive data when a computing device is lost or stolen, but also protects sensitive information from some malicious users and malicious software that have access to the computing device.

SUMMARY OF THE INVENTION

In accordance with an embodiment of the invention there is provided a method comprising: assigning a first privilege level to a first process, the first process in execution on a processor of a computer system, the first privilege level other than related to a privilege level of a user of the process or a group of the user; storing a first data file in a data store; requesting access to the first data file by the first process; evaluating the first privilege level of the first process by a second process, the second process in execution on the processor of the computer system and the second process for controlling access to file data by the first process; and in dependence upon the first privilege level of the first process, the second process is operable one of to provide access to the first data file stored in the data store to the first process and to deny access to the first data file stored in the data store to the first process.

In accordance with another embodiment of the invention there is provided a method comprising: providing an operating system comprising security for securing data and for providing user access to data based on security policies associated with a user; providing a first application for execution within the operating system; and, assigning to the first application security policies for being applied to restrict access to data accessed within or through the operating system based on the security policies, at least some of the security policies independent of the security policies of both a user of the application and a group of a user of the application.

In accordance with another embodiment of the invention there is provided a method comprising: establishing trust between the computer system and the second system; evaluating by the second system the first privilege level of the first process in execution within the computer system; when the first privilege level is sufficient to provide access to the cipher data, providing access to at least some of the cipher data; and when the first privilege level is insufficient to support access to the cipher data, other than providing access to the at least some of the cipher data.

BRIEF DESCRIPTION OF THE DRAWINGS

Embodiments of the invention will now be described with reference to the drawings in which like numbered elements are similar and in which.

DETAILED DESCRIPTION OF EMBODIMENTS OF THE INVENTION

Most computing devices used today require an operating system that facilitates the interaction between application programs and the hardware of the computing device. Those skilled in the art know that most modern operating systems implement security mechanisms that allow security policies against users, groups, and devices that grant, deny or restrict access to secured data objects. Fundamentally, this is believed to suffice since a user's access profile should determine all of the data a user is entitled to access and should not change. Further, a device's access privileges relate directly to the operation of said device and, as such typically cannot change. As such, a user either accesses data or does not. It was proposed and has been shown that a same user is grantable several different security levels, for example to prevent accidental modification of data, either entered through separate user profiles or through provision of a secondary password, for example modification of a file requires a modification password. That said, each of these security methodologies is related to the user of the information, be it a person, a group or a device.

It is now proposed to implement security access restrictions to processes and application programs, thus allowing security policies to be applied against an application during execution, above and beyond security policies for users, groups, and devices.

By elevating the application program to the level of an object that is subject to security policies, it is now possible to restrict an interaction of different applications and/or processes in execution within a same environment (i.e. on a same machine, by a same user) and also to implement a robust data protection mechanism which allows only certain application programs to gain access to plain text versions of encrypted files—decrypted files—while other application programs executing within the same environment are either denied access to said encrypted files or are only able to see the secured version of the files—the encrypted version of the files. Further optionally, access to data within processes during execution is controlled in dependence upon said same security policies.

As such, data exchange mechanisms such as, but not limited to, a system clipboard and networks sockets are restricted to make sure that data from one application program is not transferred over to other application programs with lesser security permissions within the same environment. Further, computer data that is persistent within a file system (i.e. computer files) is also secured such that, data written by application programs with higher security privileges cannot be read by other application programs with lesser security privileges. Alternatively, data is secured based on security policy data allowing applications or processes to restrict some data and publish other data.

Figure 1:
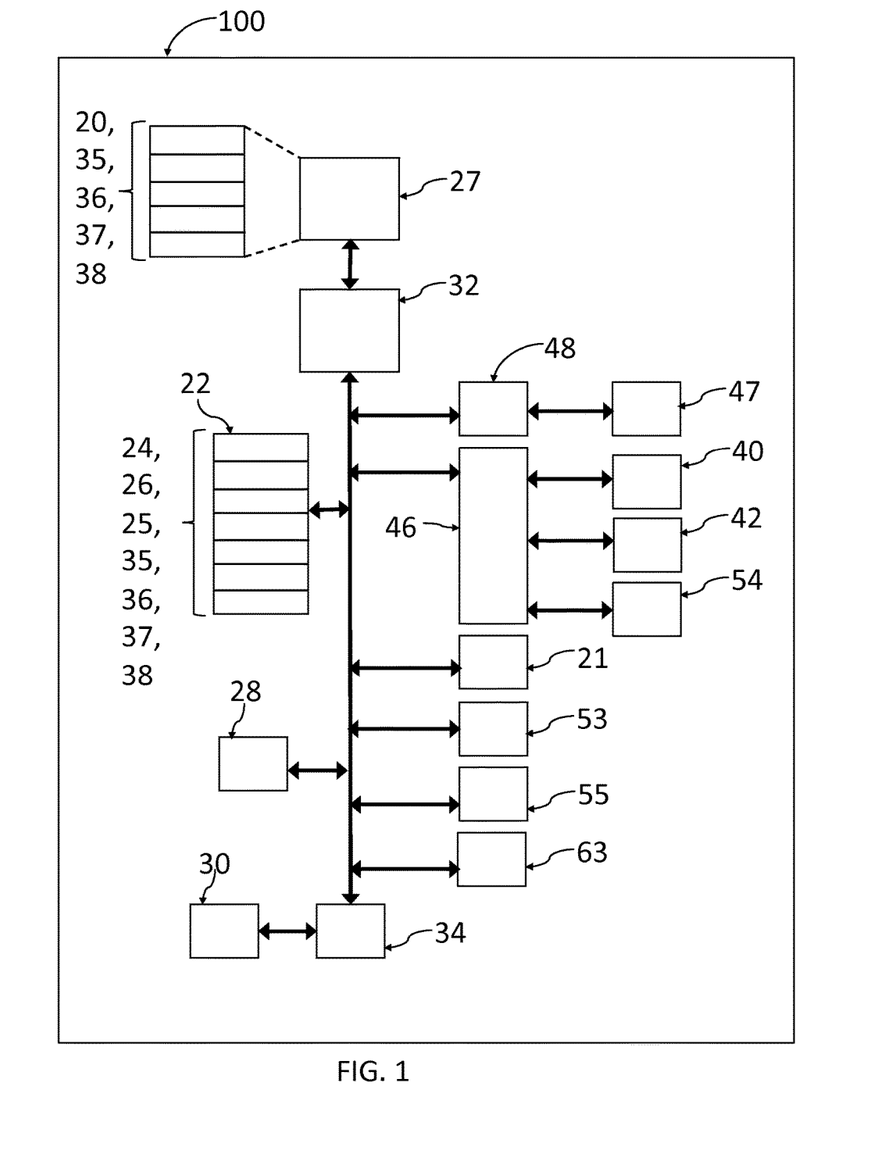
FIG. 1 is a simplified general block diagram of an exemplary computing environment.

FIG. 1 provides a brief general description of a suitable computing environment in which some embodiments of the invention are implementable. Computing device 100 includes non-volatile storage in the form of hard disk drive 27. The hard disk drive 27 comprises data stored therein such as a file allocation table 20 for indicating file locations within the hard disk drive 27, operating system data and files 35, application program files 36, other program files 37 and data 38. The hard disk drive 27 also has an interface 32 for receiving and providing data from and to the hard disk drive 27. Typically, the interface 32 is coupled with a data bus shown with arrows connecting to different parts of the computing device 100. The computing device 100 further comprises a video adapter 48, serial port 46, processing unit 21, network interface 53, host adapter 55, magnetic disk drive interface forming part of a floppy disk drive 28, and optical disk drive interface 34 forming part of an optical drive 30, a USB controller 63, and system memory 22 including ROM 24, BIOS 26, RAM 25, application programs 36, other programs 37, OS 35, and program data 38. The computer also includes interface elements such as monitor 47, keyboard 40, mouse 42, and modem 54. Many of the components shown are or have been standard components for personal computers.

Figure 2:
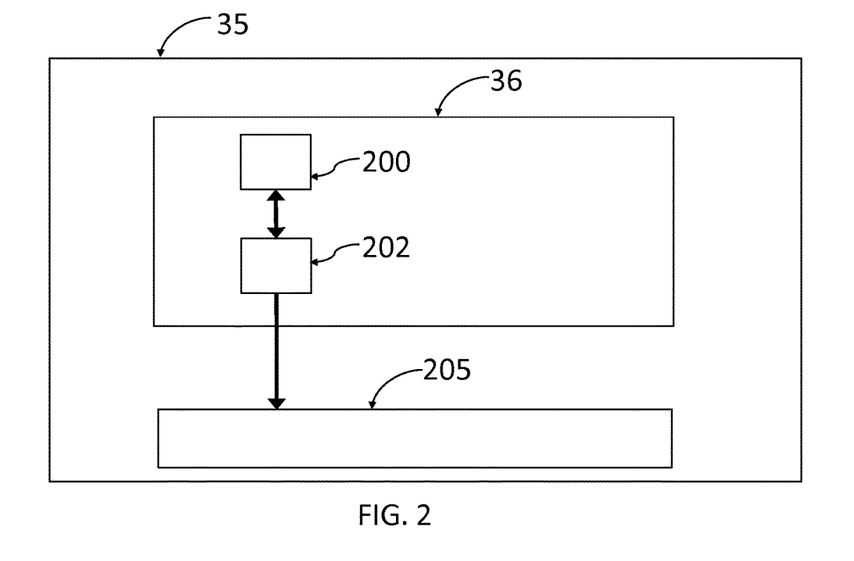
FIG. 2 is a simplified block diagram of an operating system environment that suitably represents the logic of existing operating systems 35, whereby application programs 36 contain function calls to OS API functions 202 that are used to interface with underlying OS subsystems 205. Of particular note is how the application code 200 calls OS API functions 202 in order to interface with the OS subsystems 205.

FIG. 2 illustrates a simplified block diagram of an operating system environment that suitably represents the logic of existing operating systems 35, whereby application programs 36 comprise function calls to OS API functions 202 that are used to interface with underlying OS subsystems 205. Of particular note is how the application program code 200 invokes OS API functions 202 in order to interface with the OS subsystems 205.

Figure 3:
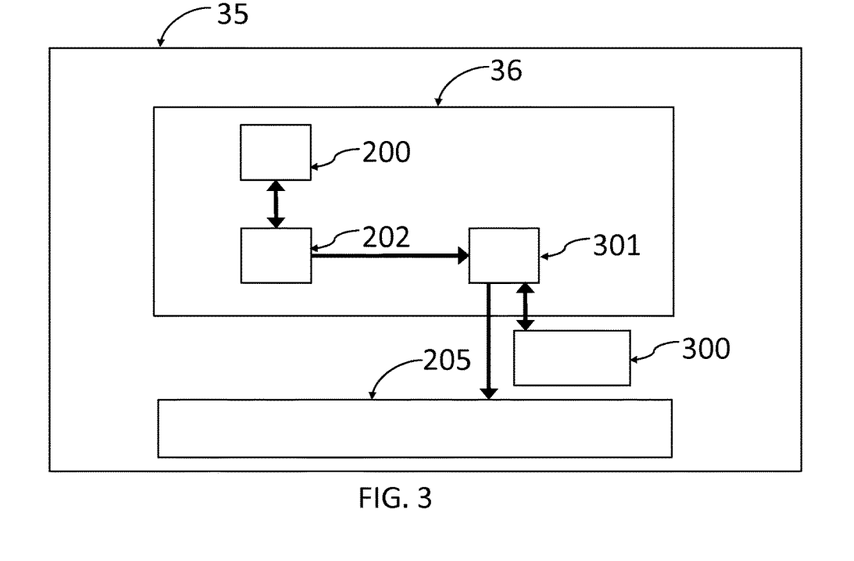
FIG. 3 is a simplified block diagram of a computer system illustrating a mechanism of function hooking wherein the regular flow of logic is redirected such that the default behavior of OS API functions 202 gets superseded by that of the OS API override 301, allowing for either additional processing or totally different processing to occur.

The present embodiment relies on a mechanism of function hooking, as illustrated in FIG. 3, where the regular flow of logic is redirected such that the default behavior of OS API functions 202 gets superseded by that of OS API override 301 This allows for either additional processing or totally different processing to occur in response to an OS API function call. Alternatively, a future operating system could include the additional functions therein to provide applications and/or processes with associated security levels. The embodiment introduces a method for enforcing security policies on a per application programs 36 basis and/or per process basis. In this fashion application programs 36 and processes become objects that are subject to security policies. The present embodiment creates a virtual "Operating System abstraction layer" enabling operating system behavior to differ from one application program 36 or process to another.

The OS API override 301 logic is implemented in accordance with the present embodiment such that its behavior optionally differs from one application program 36 to another, depending on which security policies are associated with the application program 36. A security manager 300 is used for controlling OS API overrides behavior and for ensuring that each application program 36 in execution is properly controlled based on an associated set of security policies, the application program 36 making calls to the OS API override 301 and optionally, a user within whose virtual space the application program 36 is executing. Such a security manager 300 is, for example, a system service or a kernel level driver. Though the present embodiment describes the security manager 300 as a system or kernel service, it can be implemented in various forms as to allow it to respond to the operating system 35 and operating system specific functionalities.

In a specific embodiment of the invention, application programs 36 are associated with groups used to represent varying trust levels representing a hierarchy of trust levels that ranges from fully trusted application programs that are given the maximum level of privilege to banned application programs that are prevented from executing within the OS 35. An exemplary trust level hierarchy is shown in FIG. 22. Of course, other trust levels or policies are also supported.

Figure 4:
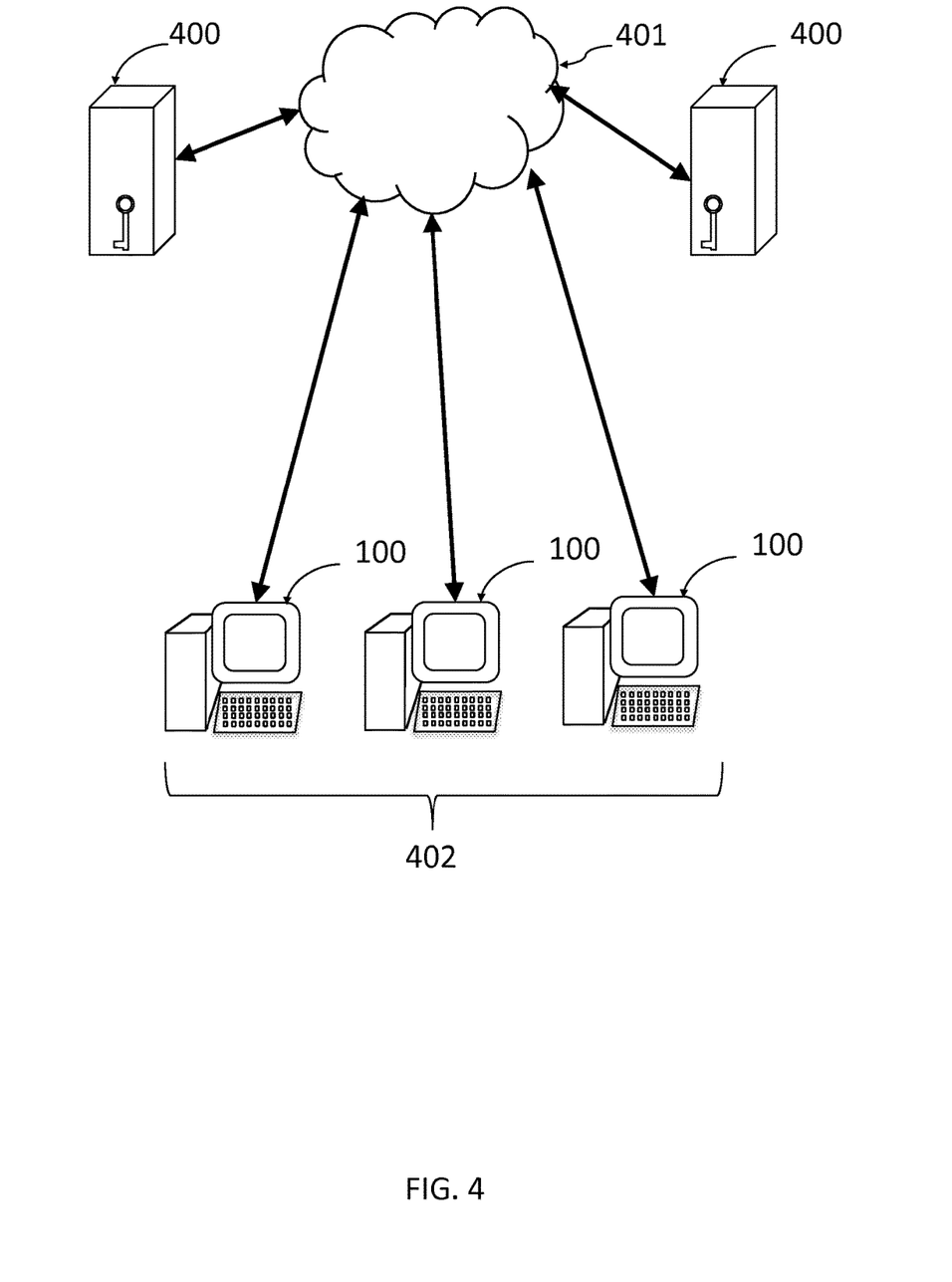
FIG. 4 is a simplified network diagram illustrating several computing devices 100 managed by one or more security controllers 400 that are used to establish a trust with each remote client 402 and to deploy security policies and allow system administrators to manage security policies within the network.

FIG. 4 is a simplified network diagram. The diagram of FIG. 4 illustrates how several computing devices 100 in the form of remote clients 402 are managed by security controllers 400. Optionally, only one security controller 400 is implemented for supporting numerous remote clients 402. Security controllers 400 for example are integrated within domain controllers. Alternatively, security controllers 400 are standalone security policy servers. The security controllers 400 establish a trust with each remote client 402, deploy security policies, and allow system administrators to manage security policies. In some embodiments, there is one master security controller and a series of distributed security controllers. Alternatively, there is one active security controller and at least one backup security controller. A backup security controller is also implementable with distributed security controllers or with a plurality of master security controllers.

Figure 5:
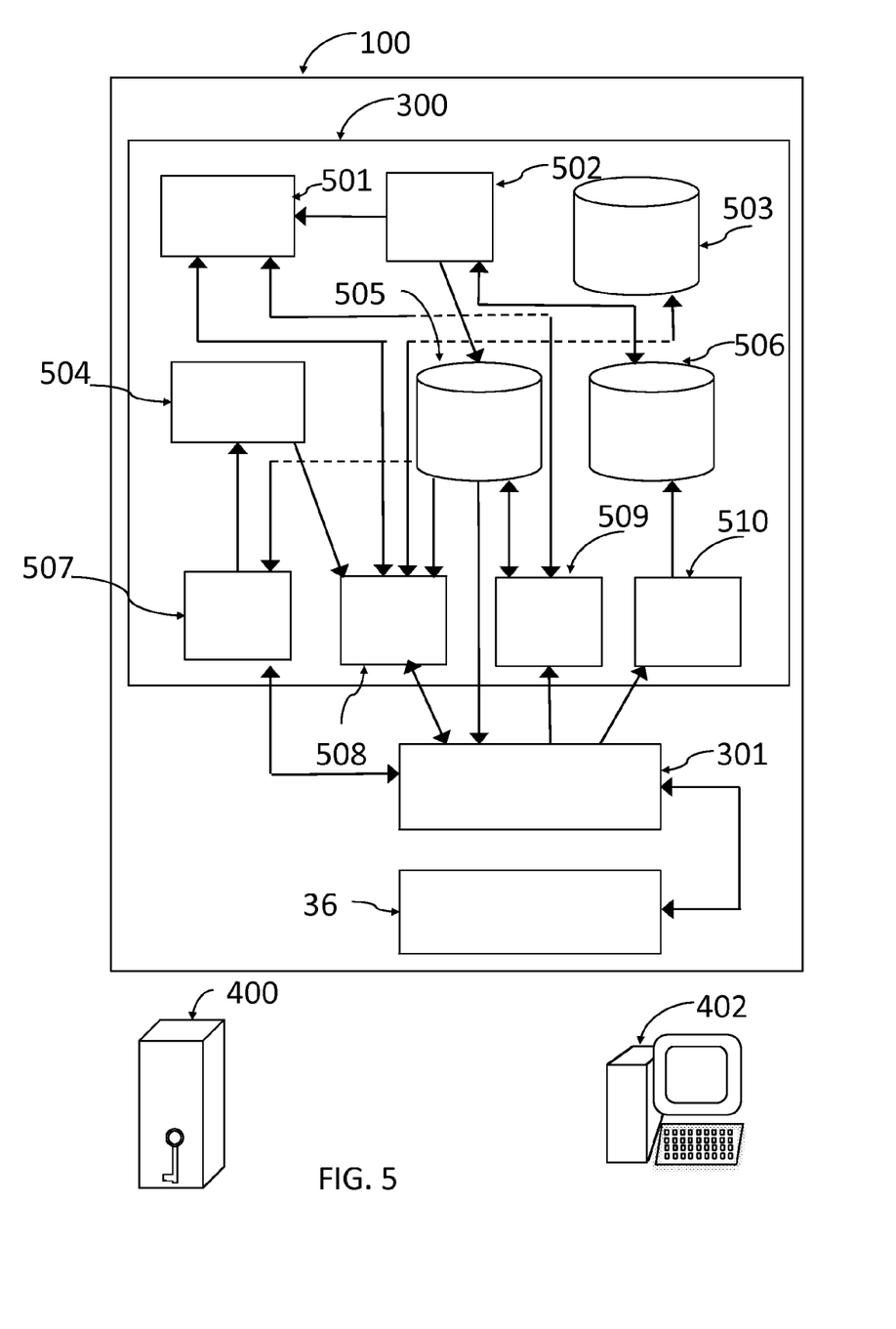
FIG. 5 is a simplified diagram of a computer system for supporting security policies applied to applications and processes.

FIG. 5 is a block diagram of an embodiment of security manager 300 presented to facilitate understanding of the embodiments presented herein. Here the OS API overrides 301 interface with the security manager 300 through four distinct mechanisms:

Application Monitor 507 detects when an application program 36 begins execution and stops executing. Application Monitor 507 allows the security manager 300 to correctly identify and register the application program 36 within registered applications 504. This is performed, for example using one or more of various mechanisms such as digital signed binary files, a SHA-1 hash, a SHA-256 hash, etc. The security manager 300 then selects associated security policies 505 for being applied to each and every registered application 504.

The cipher key manager 508 allows application programs 36 with sufficient privileges to retrieve cryptographic keys for decrypting encrypted files. Various security policies for determining when a request for a cryptographic key is responded to positively or negatively are implementable depending on the nature of the system and of applications for execution therein. When the cryptographic key is other than stored within a local cach 503, the cipher key manager 508 communicates with security controller 400 via transaction handler 501 in order to recover a cryptographic key. This is described further hereinbelow.

In some embodiments, socket manager 509 enforces security restrictions on communication sockets such that application programs 36 associated with insufficient privileges are blocked from connecting to sockets, local, remote, or both of higher privileges. In some circumstances, security policies require that both endpoints of a socket connection have identical privileges. The socket manager 509 relies upon the transaction manager 501 in order to register application programs 36 with the security controller 400 such that remote clients 402 have access to that information and determine the security privileges of application programs 36 remotely executing. Handling of socket connection requests is thereby enforced by the socket manager. Alternatively, security restrictions are enforced differently.

In some embodiments, audit recorder 510 records an audit log of system activities such that audit logs within a cache 506 are uploaded to the security controller 400 via the transaction manager 501. Optionally, the audit log is stored locally in a secure fashion. Optionally, the audit log comprises an audit of system activities as defined by stored policies. Optionally, the audit log is tamper proof.

Optionally, update manager 502 occasionally updates locally cached security policies stored with policy cache 505 by retrieving current data from the security controller 400 via the transaction manager 501. Optionally, security policies dictate that a failure to communicate with the security controller 400 represents a loss of trust. In such a situation all locally cached cipher keys within key cache 503 are deleted and computing device 100 is flagged as untrusted.

Figure 6:
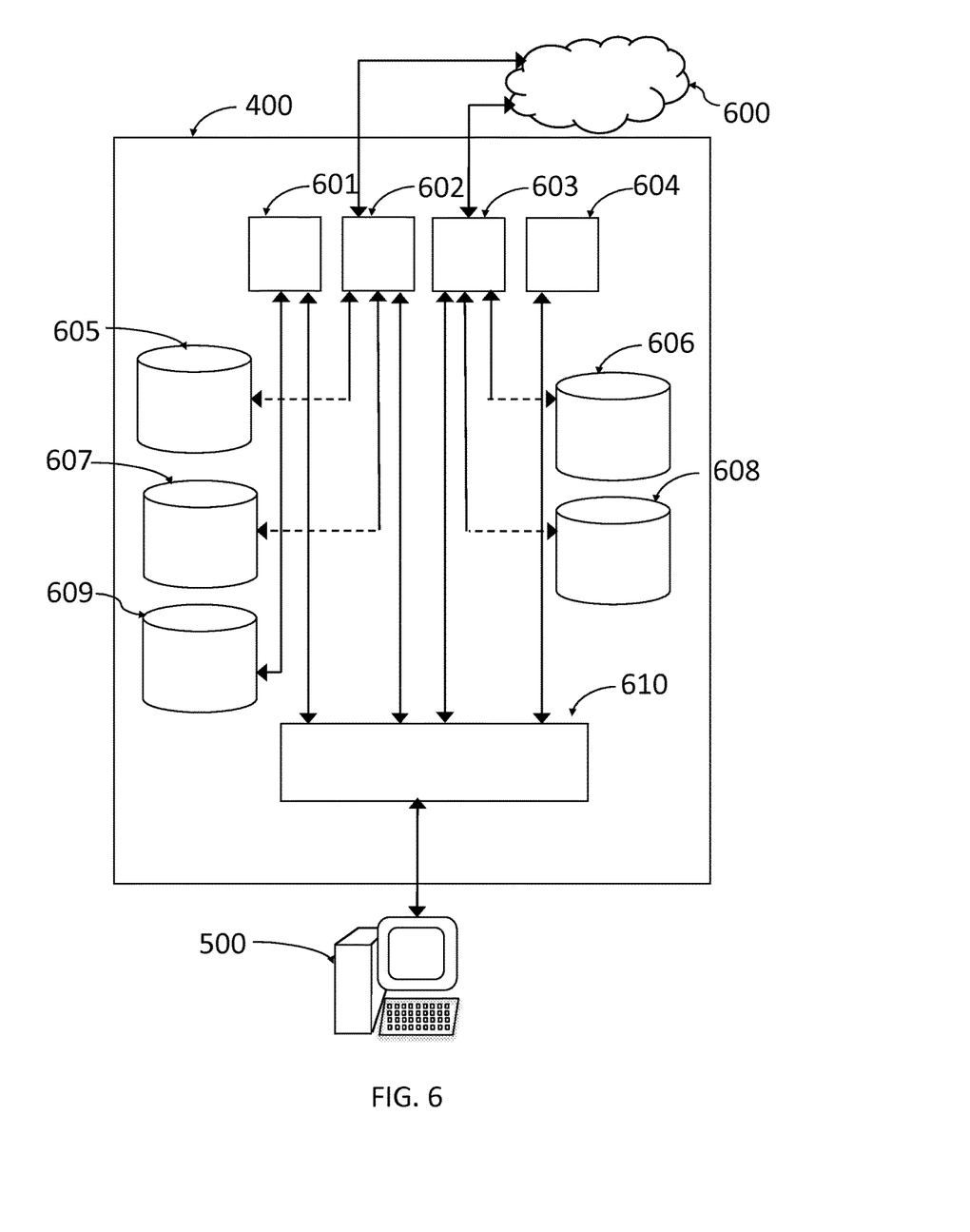
FIG. 6 is a simplified diagram illustrating a possible embodiment of a server controller 400, wherein incoming transactions 610 interface with four distinct handlers, audit, identity, policy, and key recovery.

FIG. 6 is a block diagram of a server controller illustrating a simplified embodiment of server controller 400. Here incoming transactions 610 interface with four handlers:

Audit manager 601 is aggregates incoming audit logs into audit log 609 and analyzes audit events for unusual activity that raises alerts or causes the security controller 400 to modify a trust of remote client 500.

Identity manager 602 ensures that an incoming transaction 609 from a remote client 500 originates from remote client 500 and not from another computing device pretending to be remote client 500. Preferably, a strong trust relationship is defined between security controller 400 and each remote client 500. It is important to ensure that when a remote client 500 connects with the security controller 400, it is identified correctly. Existing identification mechanisms such as Kerberos are optionally relied upon. The identity manager 602 optionally leverages domain controllers 600 or other secure servers. In the preferred embodiment of the invention, a trust chain would be created between the security controller 500 and a trusted user 607 running on a trusted remote client 605.

The policy manager 603 manages and deploys security policies to remote clients 500. Security policies optionally include group policies 606, application policies 608 and existing security policies from sources such as domain controllers 600. The policy manager 603 aggregates security policies from various sources and then deploys said policies to the remote clients 500. The policy manager 603 also ensures remote client 500 and transacting application program 36 have a right to data in the form of policy data and cryptographic keys via key recovery controller 604.

The key recovery controller 604 is for recovering a cryptographic key for an encrypted file that is stored on a remote client 500. Remote clients 500 transact with the security controller 400 to read or write to an encrypted file when the local key cache 503 other than contains the associated key data.

Figure 7:
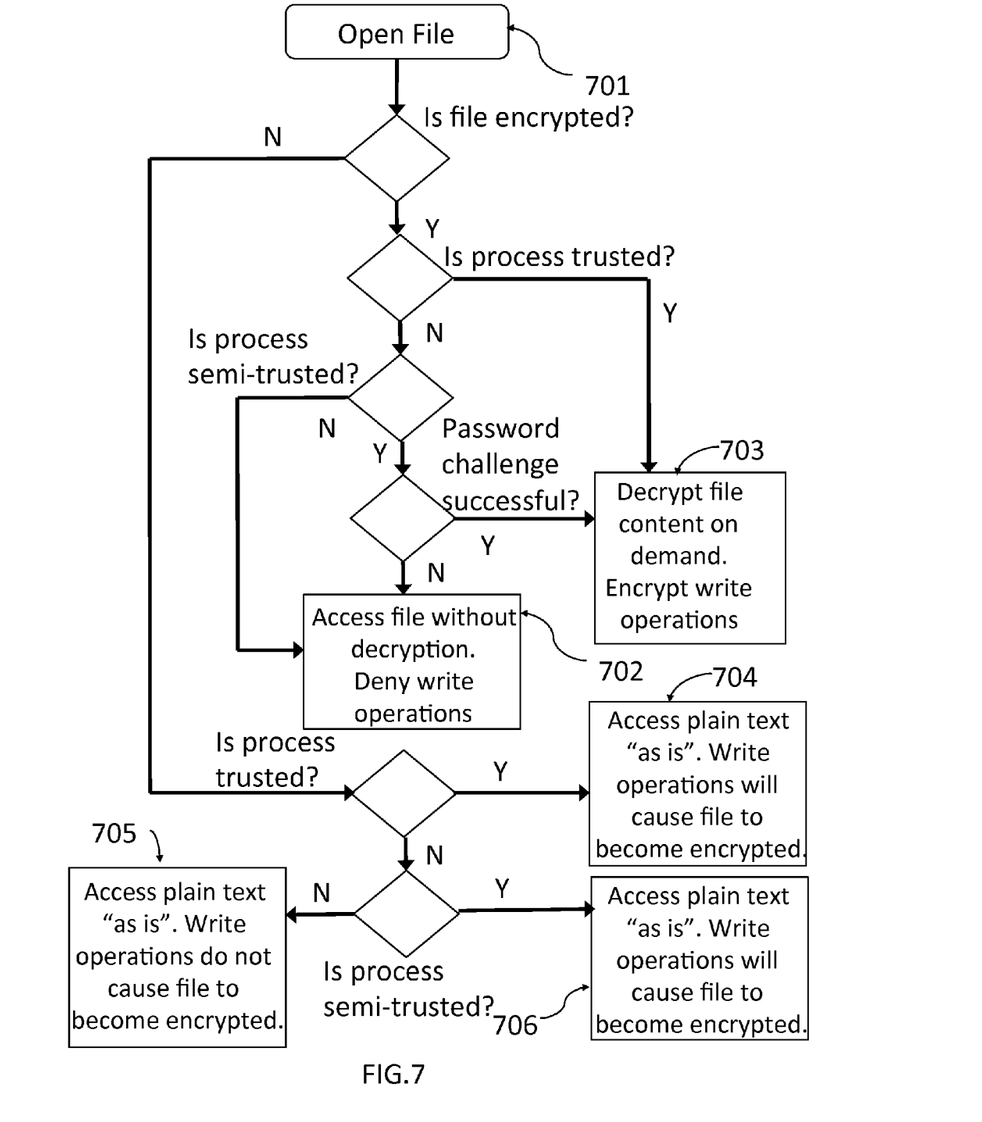
FIG. 7 is a simplified flow diagram of a method implementing decision logic for use in an environment where application programs 36 fall in one of three security groups, namely trusted, semi-trusted and non-trusted.

Preferably, data files are individually encrypted with individual security keys and then decrypted on demand if the application program 36 attempting to read/write to the encrypted file has sufficient privileges indicated within locally cached security policies 505. In order to better illustrate this concept, FIG. 7 is a simplified flow diagram of a method comprising decision logic where application programs 36 are each in one of three security groups—trusted, semi-trusted and non-trusted. A file is opened at 701. A series of decisions follow relating to the file level security—is the file encrypted—and the process security—is the process trusted, semi-trusted, or untrusted. At 702 the file is accessed with decryption and at 703 the file is accessed. If the file is not encrypted, the trust level of the process is evaluated to determine if the file should be secured. When the process is untrusted, the plain-text file is unchanged at 705. Otherwise, the file is encrypted, either right away or the next time it is modified at 704 and 706.

A cryptographic key required to decrypt a first file is embedded within the file itself using a mechanism such as asymmetric encryption relying upon two portions of an asymmetric key. Recovery of the cryptographic key is performed by a security controller 400 that has one portion of the asymmetric key pair. For performance, cryptographic keys that are generated or recovered are optionally cached within a local cipher key cache 503.

Only trusted application programs 36 are provided access to encrypted files. Files that are created or modified by the application program are automatically encrypted, thus guaranteeing that any and all persistent data handled by the application program is secured. On Microsoft Windows operating system 35, the operating system application process interface (API) hooked encompasses file system API calls such as but not limited to the following: CreateFile( ), CreateFileEx( ), CloseHandle( ), ReadFileQ, ReadFileEx( ), WriteFile( ) and WriteFileEx( ). File mapping API calls would also have to be hooked, API calls such as CreateFileMapping( ) and MapviewOfFile( ). Basically, any operating system call that causes a persistent file to be created, opened, modified and/or closed is hooked in order for default operating system behavior to be replaced or modified by the more complex policy resolution process and encryption and decryption logic. Implementation within other operating systems typically involves a similar process depending on implementation dependant details of file system is access by application programs 36.

Application program that is assigned higher privileges causes files that it writes to be encrypted. There are two possible scenarios for deciding when to encrypt a file. If the file already existed in plain text before a write operating, it is converted into an encrypted file when the next write operation occurs. If it is a newly created file, then as soon as data is stored within it, the data is encrypted. File content is encrypted, for example, in fixed sized blocks using a symmetric cryptographic key that is optionally unique to the file.

Figure 11:
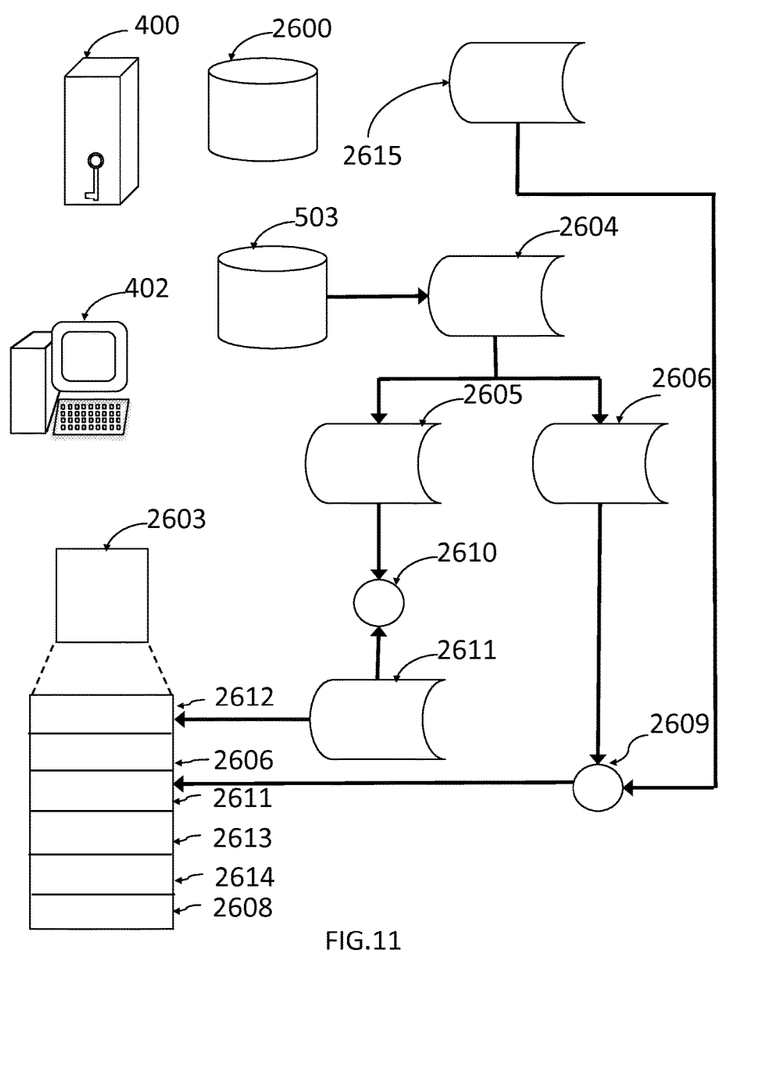
FIG. 11 is a simplified data block diagram relating to encryption for use with embodiments of the present invention.

As illustrated in FIG. 11, for each encrypted file one symmetric cryptographic key 2611 and one asymmetric cryptographic key pair 2604 are generated. The private portion of the asymmetric key 2605 is used to encrypt 2610 the symmetric key 2611 and the public portion 2606 of the asymmetric key (i.e. the key capable of recovering the encrypted symmetric key) is encrypted 2609 using a public key 2615 that is tied to a privilege level of the encrypted file. The security controller 400 contains all of private keys 2600 assigned to each privilege level. When the cipher key manager 508 on a remote client 402 attempts to retrieve the cryptographic key assigned to a specific file and the key is not stored in the local key cache 503, the remote client 402 initiates key recovery by communicating with the security controller 400, which has stored therein the private asymmetric keys for each privilege level. Thus, using an appropriate private asymmetric key based on policy, the security controller 400 recovers cryptographic information for the file by first resolving the asymmetric key and then using that key to decrypt the asymmetrically encrypted symmetric key.

In an embodiment, each encrypted file 2603 includes a block of metadata along with one or more fixed sized blocks (2608) of encrypted data. The block of metadata includes data such as the following:

An encrypted file marker 2612 in the form of a deterministic data value denoting that the file is encrypted.

A unique file identifier 2613 such as a 128 bit or 256 bit GUID (Globally Unique Identifier) used for tracking and auditing purposes.

A security group identifier 2614 such as a 128 bit or 256 bit GUID. This is relied upon during the key recovery process to help determine which private encryption key to use to recover the internal symmetric key. Optionally, all application programs with identical levels of privileges are assigned identical security group identifiers.

A data block comprising the symmetric key 2611 used to encrypt/decrypt the file content. The data block is encrypted with the private key 2605 of asymmetric key pair 2604 that is unique to the file.

A data block comprising public key 2606 is also stored.

Figure 8:
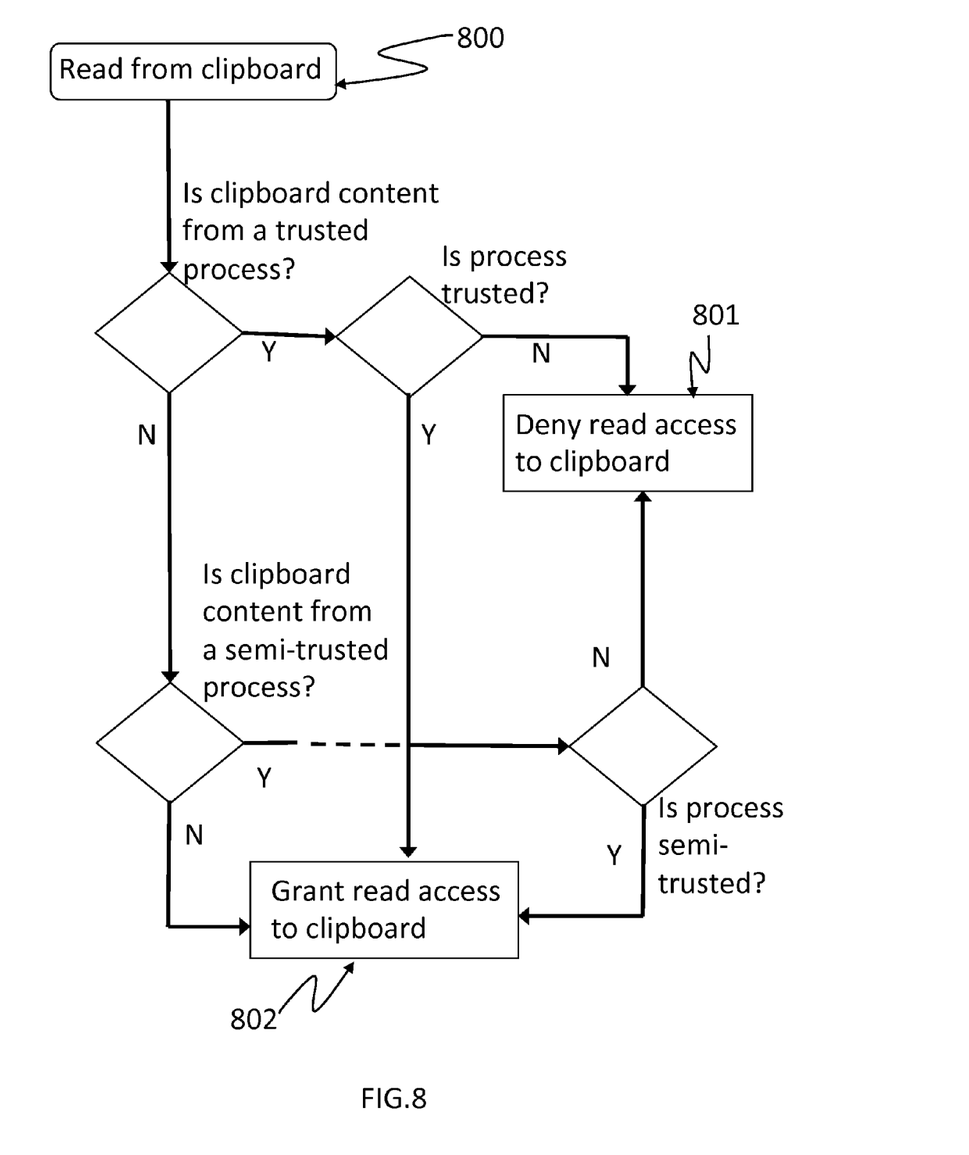
FIG. 8 is a simplified flow diagram illustrating a method for securing clipboard contents.

In some embodiments, a system clipboard is secured such that information from an application program 36 associated with a higher privilege or a different group is inaccessible from an application program 36 of lesser or different privilege. FIG. 8 shows a simplified flow diagram illustrating an embodiment, where requesting to read from the system clipboard at 800 invokes the security manager 300. The security manager 300 first determines whether or not the data within the clipboard originate from an application program 36 of privilege and whether or not the application program 36 attempting to read the clipboard has sufficient privilege to access the data. The application program 36 is allowed to read the data from the clipboard at 802 when policies and privileges so allow; otherwise access is denied at 801.

In this fashion, the content of the system clipboard can be prevented from being used to transfer sensitive data from a first application program with higher privilege to a second application program of lesser privilege.

In an embodiment implemented on the Microsoft Windows operating system 35, the operating system application process interface (API) calls to be hooked include clipboard system API calls such as OpenClipboard( ), EmptyClipboard( ), GetClipboardData( ), and SetClipboardData( ). In a simple embodiment, when an application program 36 calls SetClipboardData( ) a globally shared variable is initialized with the privilege level of the application program 36 that is initializing the clipboard. When any other application program 36 initiates GetClipboardData( ), the function succeeds when the programs privilege level is equal or higher than the value set within the globally shared variable. Otherwise, the function reacts as though the clipboard is empty. Implementation within other operating systems is also supported.

Similar to the system clipboard discussed hereinabove, network sockets are also used to transfer data between application programs. In some embodiments, the implementation of a socket manager 509 mechanism within the security manager 300 is advantageous to ensure that network connections between application programs of incompatible privilege are one of avoided and filtered. This prevents a transfer of secure data from an application program of higher privilege to one of lesser privilege.

Figure 9:
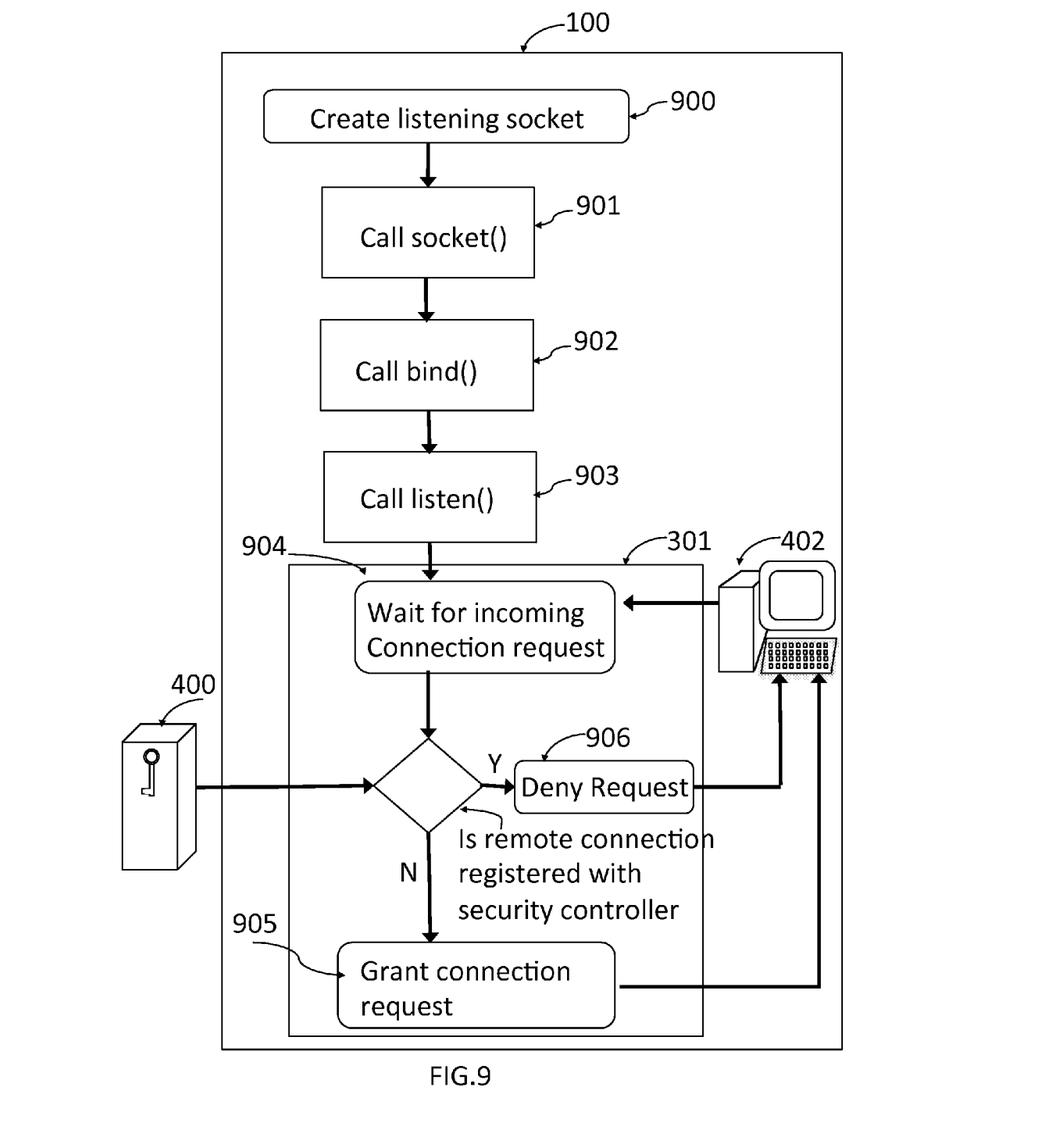
FIG. 9 is a simplified flow diagram illustrating exemplary decision logic for creating a listening network socket.
Figure 10:
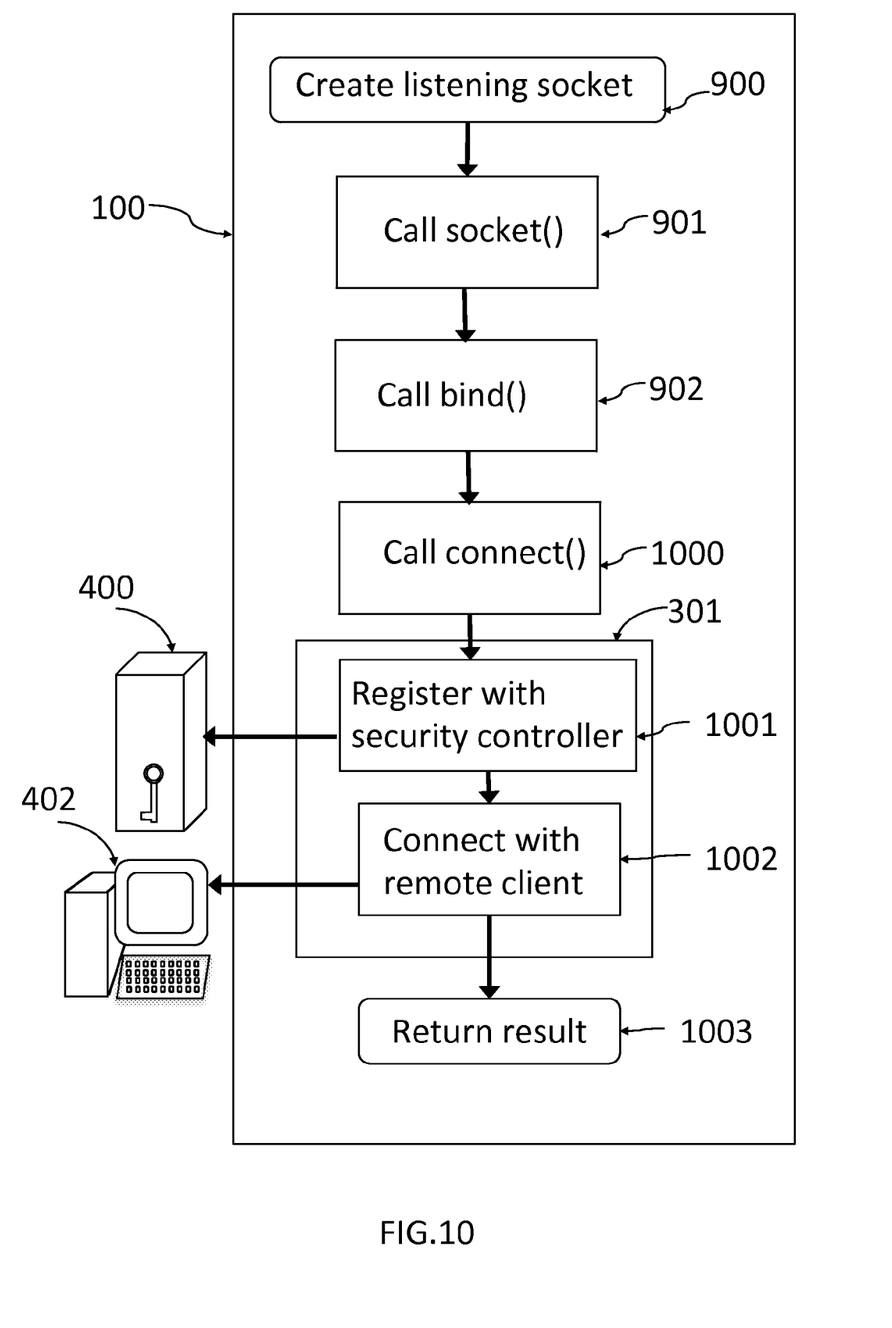
FIG. 10 is a simplified flow diagram illustrating exemplary decision logic for attempting to connect to a remote listening network socket.

FIGS. 9 and 10 are simplified flow diagrams illustrating exemplary decision logic that would be implemented to secure network sockets. Application program 36 creates a listening network socket through the process shown in FIG. 9 and an application program attempting to connect to a remote listening network socket is shown in FIG. 10.

Referring to FIG. 9, shown is a flow diagram for deciding whether to grant a connection request at 905 or whether to deny said request at 906. At 900 a listening socket is created. At 901 socket( ) is called, at 902 bind( ) is called and at 903 listen( ) is called. At 904 the system awaits an incoming connection request. When an incoming request arrives, a trust level of the requestor process is determined and either 905 or 906 are selected. Conversely for connecting as shown in FIG. 10, connect( ), is called instead of listen at 1000. At 1001, the connect requestor process is registered with the security controller. At 1002, a connection is made with a remote client and at 1003 a result is returned. As noted with regards to FIG. 9, the result varies depending on trust of the requestor process.

Security controller 400 is used as a brokerage mechanism between remote clients 500 allowing the remote client 500 that is listening at 900, 901, 902 & 903 for an incoming connection to ensure that the application program in execution on the remote client 500 that is attempting to connect at 904 does have adequate security privileges to complete the connection; otherwise the connection is refused.

In an embodiment implemented using Microsoft Windows operating system 35, the operating system application process interface (API) calls that are hooked include network socket API calls such as listen( ), accept( ), and connect( ). Any calls that initialize a network connection either by creating a new connection with listen( ) or by trying to connect to an existing connection with connect( ) are hooked in order to extend the default operating system behavior such that the security controller 400 is queried. This ensures that both sides of the connection have compatible privileges. Alternatively, implementation is within other operating systems, which is also supported.

There are other operating system resources that are shared between application programs. Some of these are usable to transfer data from one application program 36 to another. Preferable, OS API override 301 hooks ODS calls to ensure that application programs 36 of lesser privilege do not share these resources with application programs 36 of higher privilege. Examples of such shared resources include global file mappings, mail slots or named pipes, etc.

With Microsoft Windows operating system 35, application process interface (API) calls are hooked when they involve shared resources such as mail slots, global file mappings and named pipes. In each of these cases, there is one application program that creates the shared resource and then other application programs might attempt to use the shared resource. Any API calls for consuming an existing shared resource optionally fails when the privilege level of the resource consumer application is not identical to the privilege level of the resource initiator application. Optionally, the process is implemented within other operating systems.

Though privilege levels are described throughout as being higher or lower, in an alternative embodiment privileges and privilege levels are more complex than merely higher and lower. In such an embodiment, privilege levels are compatible and incompatible and are evaluated for compatibility based on policy data.

Numerous other embodiments may be envisaged without departing from the scope of the invention.

What is claimed is:

1. A method comprising:
   assigning a first privilege level to a first process, the first process in execution on a hardware processor of a computer system, the first privilege level other than related to a privilege level of a user of the first process or a group of the user;
   assigning a second privilege level to a second process, the second process in execution on the processor of the computer system, the second privilege level other than related to a privilege level of a user of the second process or a group of the user, the second privilege level being more restricted than the first privilege level;
   storing a first data file in a data store, the first data file encrypted, and wherein a privilege level greater than or equal to the first privilege level is required to obtain access to a plain text version of the first data file;
   requesting access to the first data file by the first process and by the second process;
   evaluating the first privilege level of the first process and evaluating the second privilege level of the second process by a third process, the third process in execution on the processor of the computer system and the third process for controlling access to file data by the first process and by the second process; and
   in dependence upon the first privilege level of the first process and the second privilege level of the second process, providing by the third process:
      access to a plain text version of the first data file stored in the data store to the first process; and
      access to an encrypted version of the first data file stored in the data store to the second process,
   wherein the first process is always provided the plain text version of the first file and the second process is always provided the encrypted version of the first data file in response to a file access request for the first file.

2. A method according to claim 1 comprising:
   requesting access to the first data file by the first process for storing file data of the first data file;
   evaluating the first privilege level of the first process by the second process; and
   in dependence upon the first privilege level of the first process, the second process is operable to support one of storing a plain text version of the first data file within the data store and storing an encrypted version of the first data file within the data store, the second process operable to provide same support to the first process in response to a file access request for a same file.

3. A method according to claim 2 wherein a same one of providing a plain text operation or providing a cipher operation is provided for a same process for both storage and retrieval of a same first data file.

4. A method according to claim 1 wherein a same file stored in encrypted form is always by a same first process accessing said file in plain text form stored in encrypted form.

5. A method according to claim 1 wherein the data store is in data communication with the processor of the computer system via a communication network and wherein access to the first data file is provided via the communication network.

6. A method according to claim 1 comprising:
providing access to the first data file to the first process.

7. A method according to claim 6 wherein the access provided is selected from a plurality of types of access supported by the system.

8. A method according to claim 1 wherein the first data file comprises a system clipboard data file.

9. A method according to claim 1 wherein access to the first data file requires access to a decryption key associated with the first data file.

10. A method according to claim 9 wherein access to the decryption key is provided in dependence upon the first privilege level of the first process and the first data file.

11. A method according to claim 10 wherein once accessed the decryption key is cached by the first process for further use thereby.

12. The method according to claim 1 wherein the second process is the computer system's operating system (OS) process.

13. A method according to claim 12 wherein the second process is called in response to a hook into the OS APIs.

14. A method according to claim 1 wherein privilege levels comprise: Top secret, full trusted, semi-trusted, non-trusted, and banned.

15. A method according to claim 1 wherein the first data file is stored within a second system and comprises cipher data for accessing first secured data, the first secured data secured with a cipher comprising:

establishing trust between the computer system and the second system;

evaluating by the second system the first privilege level of the first process in execution within the computer system;

when the first privilege level is sufficient to provide access to the cipher data, providing access to at least some of the cipher data; and when the first privilege level is insufficient to support access to the cipher data, other than providing access to the at least some of the cipher data.

* * * * *